United States Patent [19]

Uban et al.

[11] Patent Number: 5,514,284

[45] Date of Patent: May 7, 1996

[54] METHOD AND APPARATUS FOR WATER TREATMENT

[75] Inventors: Stephen A. Uban, Stillwater; Richard C. Maxson, Maple Grove, both of Minn.; Ralph W. Holliday, Minden, Nev.; Mark E. Watson, Sturbridge, Mass.

[73] Assignee: Wheelabrator Engineered Systems Inc., New Brighton, Minn.

[21] Appl. No.: 241,657

[22] Filed: May 12, 1994

[51] Int. Cl.⁶ .................................................. C02F 1/78
[52] U.S. Cl. .................. 210/709; 210/721; 210/744; 210/752; 210/760; 210/792; 210/106; 210/129; 210/192; 210/199; 210/203; 210/264; 210/274
[58] Field of Search ........................ 210/721, 744, 210/752, 760, 792, 86, 106, 129, 142, 192, 199, 203, 264, 274, 709

[56] References Cited

U.S. PATENT DOCUMENTS

| | | | |
|---|---|---|---|
| 3,510,001 | 5/1970 | Baer et al. | 210/192 |
| 3,699,776 | 10/1972 | La Raus | 210/192 |
| 4,029,578 | 6/1977 | Turk | 210/760 |
| 4,049,552 | 9/1977 | Arff | 210/760 |
| 4,060,484 | 11/1977 | Austin | 210/786 |
| 4,090,960 | 5/1978 | Cooper | 210/192 |
| 4,182,663 | 1/1980 | Vaseen | 210/760 |
| 4,317,732 | 3/1982 | Shoquist | 210/106 |
| 4,395,337 | 7/1983 | Ciepiela | 210/703 |
| 4,547,286 | 10/1985 | Hsuing | 210/738 |
| 4,619,763 | 10/1986 | O'Brien | 210/177 |
| 4,793,934 | 12/1988 | Thompson et al. | 210/715 |
| 4,849,115 | 7/1989 | Cole et al. | 210/748 |
| 4,898,672 | 2/1990 | Clifft et al. | 210/614 |
| 5,013,453 | 5/1991 | Walker | 210/721 |
| 5,032,294 | 7/1991 | Schulz | 210/795 |
| 5,106,497 | 4/1992 | Finnegan | 210/192 |
| 5,120,435 | 6/1992 | Fink | 210/192 |
| 5,145,585 | 9/1992 | Coke | 210/760 |
| 5,167,840 | 12/1992 | Jaccarino | 210/274 |
| 5,180,499 | 1/1993 | Hinson et al. | 210/721 |
| 5,234,600 | 8/1993 | Kupke | 210/744 |
| 5,266,215 | 11/1993 | Engelhard | 210/748 |

FOREIGN PATENT DOCUMENTS

| | | | |
|---|---|---|---|
| 826801 | 7/1975 | Belgium. | |
| 1528836 | 6/1968 | France. | |
| 2096947 | 3/1972 | France. | |
| 2511499 | 9/1976 | Germany | 210/192 |
| 2812794 | 9/1979 | Germany. | |

OTHER PUBLICATIONS

*Patent Abstracts of Japan*, vol. 14, No. 68, Feb. 8, 1990, Abstract No. C–0686, Ebara Jitsugyo KK, "Ozone Purifying Device of Water Tank," JP, A, 01 288395.

Primary Examiner—Peter A. Hruskoci
Assistant Examiner—Theodore M. Green
Attorney, Agent, or Firm—Klarquist Sparkman Campbell Leigh & Whinston

[57] ABSTRACT

An apparatus for treating water includes a vertically extending contact vessel, wherein water is contacted with ozone, and a return vessel which contains a column of water of a sufficient height to drive water through downstream filtering stages. Ozone is removed from the water and the rate of ozone injection is monitored and automatically adjusted so that no great amount of ozone remains in water entering the filtering stages. The ozone is generated in elongated elements that are cooled by the process water and that are positioned to serve as a static mixer for such water.

13 Claims, 1 Drawing Sheet

METHOD AND APPARATUS FOR WATER TREATMENT

SUMMARY OF THE INVENTION

The present invention relates to the purification of water which contains contaminants. More specifically, it relates to water purification wherein water is treated with ozone and is filtered to remove solids.

Over the years, numerous devices have been used to purify water by contact with ozone and/or by filtration. It has been a problem with such devices that they tend be bulky, particularly if ozonation equipment is added to a standard filter system. It has also been a problem that ozone generators produce heat which must be dissipated and that ozone-bearing water is corrosive to normal steel tankage.

A system where ozone generation is effectively integrated with a filtration process has now been discovered. In its various aspects, the system includes equipment that is compact, that cools the ozone generator, that allows standard steel tanks to be used for filtration operations, and that operates automatically.

One of the features disclosed is an apparatus wherein ozone generation tubes are submerged for cooling in the water being treated.

Another feature is the positioning of such ozone generation tubes upstream of filtration beds and downstream of the point where water treatment chemicals are added to the water. By properly arranging the tubes in an array, the tubes will serve as a static mixer. Water that passes through the array is agitated, thereby mixing the additive chemicals into the water prior to filtration.

An additional feature is the use of a tower upstream of a filtering apparatus to provide a hydraulic head that is sufficient to cause the water to flow through downstream filtering stages by gravity. Most advantageously, the tower comprises an upflow column alongside a return or downflow column, the two columns being joined at the top. With this arrangement, ozone can be injected into water in the upflow column and then removed from the water at the top of the columns. Ozone is thus removed from the process water before it enters the filtration system.

These and other features of the invention will be further understood with reference to the following description and drawings.

DETAILED DESCRIPTION

Figure 1:
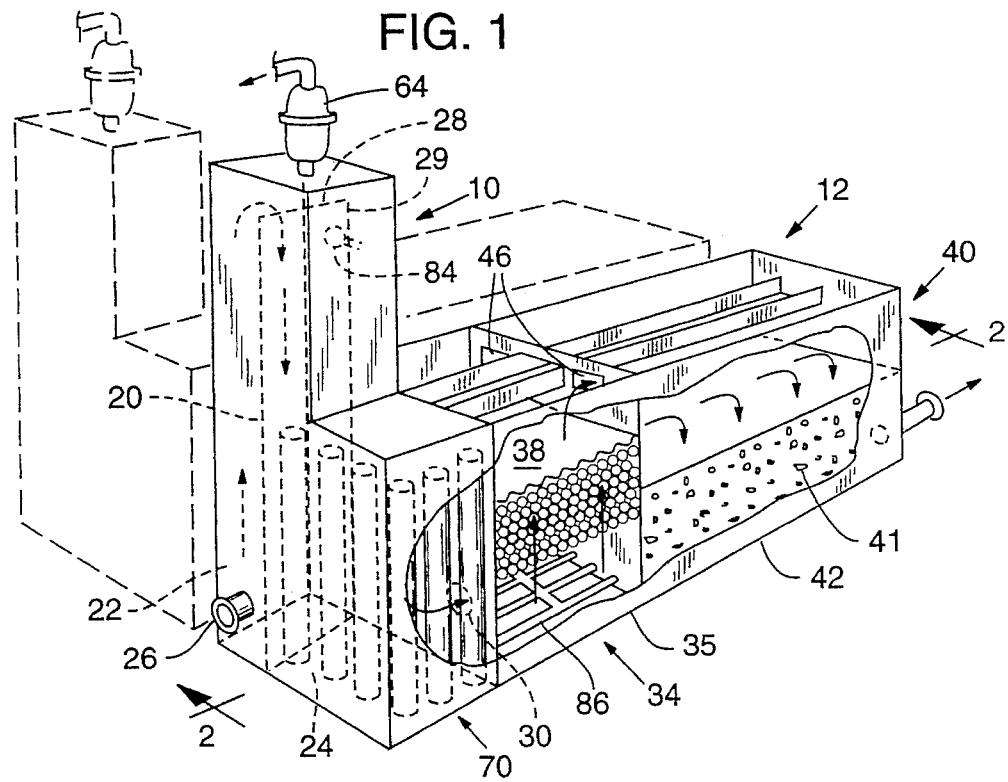
FIG. 1 is a perspective schematic view of a filter system according to the present invention.

Filtration systems according to the present invention are best understood with reference to the drawings. These show an example of a system for treating a stream of water by contact with ozone in a contactor vessel. Solids are then removed by passing the stream of water through a two-stage filter system downstream of the vessel. The illustrated filter system includes an upstream roughing filter in series with a downstream filter.

In the illustrated embodiment, water to be purified is fed to a vessel 10 that is in the configuration of a tower. Located inside the vessel is a vertical divider 20 which separates the interior of the vessel into first and second chambers. These are, respectively, an upflow zone 22 containing an upflow water column and a downflow zone 24 containing a return column. Water enters the upflow zone 22 through a process flow inlet 26, then flows upwardly to the top of the divider 20. The water then flows over a weir 28 at a top portion of the divider 20 and into the return column 24, with the weir 28 controlling the flow rate. The water then flows downwardly through the return column 24 and leaves the tower 10 through an outlet 30 located at an elevation below the weir 28. The region over the weir thus serves as the outlet of the first chamber and the inlet of the second chamber.

Water leaving the tower 10 through the outlet 30 is passed directly into a solids separation system. In the illustrated embodiment, this is a filtration system which includes an upflow clarifier device 34 provided in an upflow filter compartment defined by a vessel 35. The clarifier device 34 includes a bed of particulate material 36 that is retained beneath a screen 38 and that is buoyant in the water inside the vessel 35. The clarifier 34 is followed by a downflow filter 40, including a bed of nonbuoyant particulate material 41, provided in a downflow filter compartment defined by a vessel 42. The vessels 35, 42 are provided by a rectangular tank which is separated by an internal upright wall 44. The vessels communicate via clarifier outlets 46, which also serve as inlets for the vessel 42. Examples of suitable solids separation systems can be seen in U.S. Pat. Nos. 4,547,286, 4,608,181 and 4,793,934, which are incorporated herein by this reference, and in numerous other prior patents.

In a typical water treatment plant, water systems are provided in tandem. Therefore, when the filters in one system are being cleaned, the filters in the other are operational so that the plant continuously treats water. Such a second system is shown in broken lines at the back of FIG. 1.

Figure 3:
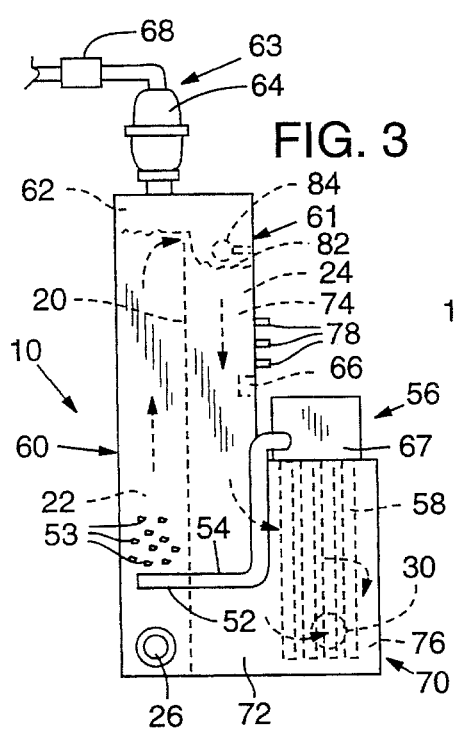
FIG. 3 is a front elevational view of the system shown in FIG. 1.
Figure 2:
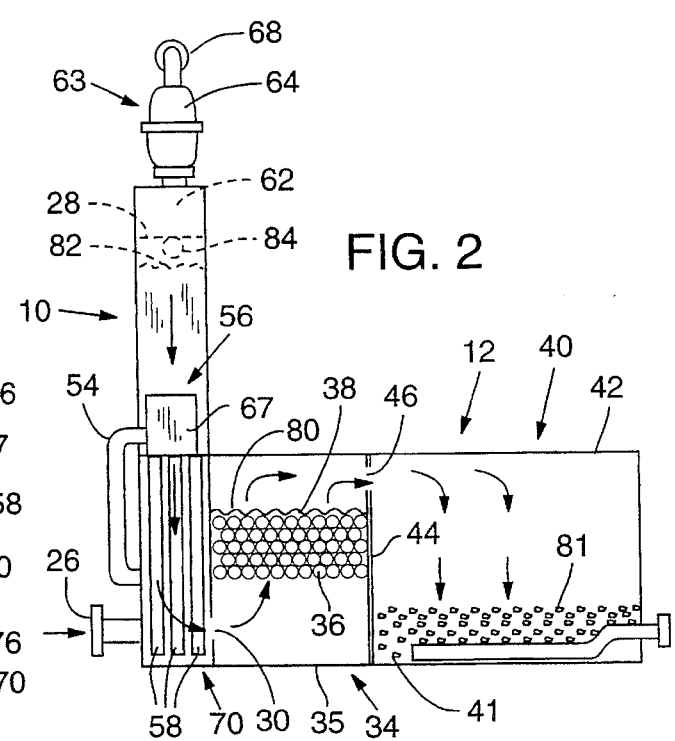
FIG. 2 is a sectional view taken along line 2—2 of FIG. 1.

The illustrated apparatus, as shown in FIGS. 2 and 3, includes an ozone injection system for contacting ozone with water in the upright upflow or contact tower 22. A gas diffuser 52 serves as an inlet for ozone-containing gas and is positioned to inject the gas into water in the column 22. The diffuser 52 is preferably located near the bottom of the column 22, either above or below the inlet 26. Most conveniently, the diffuser may be made of a porous ceramic material which facilitates the production of numerous small bubbles. Ozone is continuously supplied to the diffuser 52 via a supply line 54 which is connected to an ozone generator system 56. The rate of ozone injection is set so that the concentration of ozone in the column 22 does not exceed 3 ppm.

It should be appreciated that there are other mechanical arrangements for injecting ozone into process water. For example, if it is necessary to treat water having an ozone demand greater than 3 ppm, the apparatus could comprise a single large vessel containing multiple vertical dividers that define multiple contact zones containing multiple columns of water. Water could be directed to flow through the various chambers, preferably in a serpentine path, upwardly and downwardly, while ozone is injected into more than one of the water columns. Similarly, multiple return columns could be provided if needed. Also, although it is highly advantageous to use a unitary tower with one or more internal dividers as illustrated, multiple separate vessels could be used to define plural chambers or zones for columns of water. The flow direction pattern could be modified, e.g. so that water flows downwardly in a tower and then directly into a cooling vessel from the bottom of the tower; this would not be convenient for gas separation, but scavenger chemicals could be added to the water to react with any residual ozone.

The ozone generation equipment is of conventional design and may, for example, be assembled from OZOTEC brand equipment manufactured by Hankin Atlas Ozone Systems Ltd, Scarborough, Ontario, Canada. The ozone generator 56 includes a number of ozone production elements 58. In the illustrated embodiment, these elements are tubes that are made of stainless steel and that are electrically grounded. Each stainless steel tube surrounds an inner dielectric tube (not shown) so that there is a gap between the outer and inner tube. The inner tube is made of glass and is coated on its interior surface with an electrically conductive material. Ozone is generated by electrical discharge through dried air or oxygen that is pumped through the gap between the outer and inner tubes and, from there, to the diffuser 52.

During such generation of ozone, a considerable amount of heat is generated inside the ozone generator tubes. This heat is dissipated by positioning at least a portion of at least some of the tubes in the flow path of the water to be treated, such as in one of the chambers of the vessel 10, so that heat is transfered to the passing water.

The embodiment shown in the drawings is a particularly advantageous arrangement wherein the ozone generator tubes 58 are located inside a cooling vessel 70 and the cooling vessel has an inlet 72 that communicates with, and in the illustrated embodiment corresponds to, the outlet of the upright return tower 24. It will be appreciated that the ozone generator tubes could alternatively be positioned in the column of water 24 inside the return tower or at other locations in the path of the water being purified.

From the drawing, it will be appreciated that the illustrated cooling vessel 70 is a lateral extension of the bottom region of the return tower 10. An opening in the wall which defines the return column 24 is also the inlet 72 for the cooling vessel 70. Because the opening is large in the illustrated embodiment, the walls that enclose the return column 24 and cooling vessel 70 can be said to define a single chamber that has a reservoir region above the top of inlet 72 and a cooling region below the top of the inlet 72. The cooling vessel 70 also has an outlet which, in the illustrated embodiment, corresponds with the inlet 30 of the filtration system.

The illustrated cooling vessel 70 is particularly advantageous when used downstream of a chemical feed mechanism. It is common practice to add filtration-enhancing chemicals, particularly coagulants, to water which is to be filtered. These chemicals must be thoroughly mixed with water to have the best effect. The illustrated system includes a coagulant injection system. Water treatment chemicals, including coagulants, are added through inlet ports 78 upstream of the cooling vessel 70. The resulting mixture of water and chemicals must thus pass through the cooling vessel 70 prior to filtration. Inside the cooling vessel 70, the ozone generation tubes 58 are arranged in an array, such as the illustrated three rows of four tubes each, so that the combined water and chemicals flow in a tortuous pass through the generator tubes 58. The generator tubes thus serve as a static mixer which blends the injected chemicals with the water being treated, and the cooling vessel 70 thus also serves as a mixing vessel. After passing through the array of tubes 58, the water flows through the outlet 30 and into the filtration system as previously mentioned.

A mixture of ozone and water is corrosive to mild steel. Accordingly, the tower apparatus 10, particularly the walls of the upflow column 22, are made of a corrosion resistant material such as stainless steel. It would be unduly expensive to make the entire apparatus of such a material. Accordingly, a mechanism is provided for removing ozone from the water before it enters the filtration stages of the system. In the illustrated embodiment, gas entrained in the process water is collected in a gas collection chamber or region 62 at the top of the tower. Gas, including any unreacted ozone, is removed via a gas collector system that includes a demister 64 which is connected to a catalytic off-gas destruction system (not shown). A pump downstream of the demister 64 maintains the gas separation region 62 at a slightly subatmospheric pressure to encourage the separation of gas from water at the tops of the columns 22, 24.

A detection system is provided to be sure that substantially all ozone is removed before water enters the filtration sections of the apparatus. This system can include a device 66, such as an OZOMETER brand residual ozone analyzer manufactured by Hankin Atlas, positioned to test water at a location downstream of the gas collection chamber 62 and then signal if the ozone content of the tested water exceeds a predetermined limit. A gas supply controller unit 67, including a device such as an OZOMICRO brand controller manufactured by Hankin Atlas, is adapted to respond to a signal from the ozone detector 66 and, in response to the signal, to reduce the rate of ozone injection through the diffuser 52 when the ozone content of the sampled water exceeds the predetermined limit. Most conveniently, this is accomplished by signaling the power supply of the controller unit 67 to reduce the electrical current supplied to the electrodes of the ozone generation elements 58. Reducing the current in turn reduces the percentage of ozone in the gas injected via the diffuser 52. Instead of using an ozone analyzer, gas removed via the demister can be tested for ozone content by an ozone analyzer 68. And, if the ozone content exceeds a predetermined amount, the gas supply controller 67 is signaled to reduce the rate of ozone injection. Other methods of testing for residual ozone can be used, and will be familiar to those who are experienced in this art.

The drawings show a tower that is much higher than other parts of the apparatus. This serves two purposes. It is beneficial for the upflow or contactor column 22 to be a tall to ensure complete ozone contact. Having a tall return column 24 is helpful since it provides the hydraulic head necessary to drive the water, by gravity, through the downstream filtration system. To provide sufficient head, the height of the weir 28 is greater than the water levels required for operation of both the subsequent filtration stages 34, 40. In particular, the weir 40 is at a higher elevation than the upper surfaces of the beds 36, 41 of particulate media in both filter stages and is higher than the bottoms of the clarifier outlets 46.

For best operation, the surface 82 of water in the column 24 should be maintained within a predetermined elevation range. The surface 82 should be at a higher elevation than the tops of the beds 36, 41 of particulate media in both filter stages and should be higher than the bottoms of the clarifier outlets 46. The surface 82 should also be at least three inches below the top of the weir 28 so that water will fall freely for a distance after passing over the weir. The free falling water creates turbulence when it contacts the surface of water in the column 24. This agitation facilitates the release of gas from the water to the gas collection region 62 over the weir 28.

The level of water in the column 24 will rise as filter elements become clogged. Accordingly, an automatic apparatus is provided for sensing when the level of water in the column 24 exceeds a predetermined height. This apparatus can take a number of forms. In the illustrated embodiment, a float switch 84, provided near the top of the return column 24, serves as a level sensor. If the water in the return column rises to a height sufficient to trip the float switch, cleaning of the clarifier 34 will commence automatically in response. Other devices, such as pressure sensors (not shown), can be used for a similar task as the float switch 84. The cleaning mechanism for the clarifier 34 will advantageously include an air injection system 86 below the bed of particulate material. When the sensor detects a condition of water in the return tower, which condition indicates that the level of the water column 24 exceeds the predetermined level, the sensor signals an electronic controller (not show). The controller responds by operating fluid flow control valves to initiate cleaning, e.g. to initiate a flow of air into the air injection system 86.

To operate the illustrated apparatus, water that contains contaminants is directed to flow upwardly through the contactor tower 22 while operating the ozone generation system to inject ozone via the diffuser 52.

At the top of the column 22, any residual ozone is separated from the water. Water at the top of the column 22 the surface of the water is in contact with gas that is maintained at a slightly subatmospheric pressure, preferably from one to four inches of vacuum, in the region 62. The negative pressure maintained in the separation region 62 urges separation of gasses from the water.

Periodically, measurements are taken to ensure that the no appreciable amount of water-borne ozone enters the filter system. If more than a predetermined maximum amount of ozone is detected, the rate of ozone injection through the diffuser 32 is reduced.

After water reaches the top of the column 22, it flows over the weir 28 and then downwardly in return column 24 where it joins a pilar of water that provides a hydraulic head sufficient to drive water through downstream filtration units 34, 40 by gravity.

Before it enters the filtration units, water is passed through an array of ozone generation elements to cool the elements. In the illustrated embodiment, water passes through an array of ozone generation tubes 58. Filtration aids, particularly coagulants, are added at a location 78 upstream of the ozone generation tubes, so that the mixture of water and filter aids is agitated as it flows through the array of tubes. After agitation, the heated mixture of water and filter aid chemicals is passed through a vessel 35 containing a bed of particulate material to separate solids from the water.

If during the filtering operation it is sensed that the water level in the return column 24 has exceeded a predetermined height, automatic cleaning of the filter bed is commenced in response.

Having described a preferred embodiment of the invention, it should be understood by one skilled in the art that one can deviate from the preferred elements of the invention and still be within the concept of the invention described herein.

We claim:

1. An apparatus for treating water which contains contaminants, the apparatus comprising:

a first chamber having a water inlet and outlet arranged so that water is permitted to flow upwardly through the first chamber;

a second chamber having a water inlet and outlet, the second chamber being downstream of the first chamber and in communication therewith such that water is permitted to flow from the outlet of the first chamber to the inlet of the second chamber, the second chamber comprising a reservoir region and a cooling region which is downstream of the reservoir region;

an ozone generator system for producing ozone, the ozone generator system comprising plural elongated ozone production elements, at least some of the elements being disposed in the cooling region;

an ozone inlet positioned to inject at least a portion of the ozone into water such that ozone is contained in water that is inside the first chamber; and a solids separation system positioned to receive water from the outlet of the second chamber.

2. The apparatus according to claim 1 wherein the solids separation system comprises an upflow clarifier device wherein water flows upwardly through a bed of particulate media.

3. The apparatus according to claim 2 wherein the solids separation system further comprises a downflow filter downstream of the clarifier device.

4. An apparatus for the treatment of water which contains contaminants, the apparatus comprising:

a vessel having a water inlet and a water outlet;

a divider that is disposed in the vessel between the inlet and outlet to divide the vessel into a first chamber and a second chamber, the first chamber being adjacent to the inlet and the second chamber being adjacent to the outlet such that the water is permitted to flow in through the inlet, over the divider, and out through the outlet;

an ozone generator system comprising plural ozone generation elements, at least some of the elements being disposed in the second chamber so that water in the vessel cools the elements, and an ozone inlet positioned upstream of the ozone generation elements to inject ozone made by the ozone generation elements into water such that ozone is contained in water that is inside the first chamber; and a gas collector that is located upstream of the ozone generation elements disposed in the vessel and that is operable to separate injected ozone from the water before the water reaches the ozone generation elements disposed in the vessel.

5. The apparatus according to claim 4 wherein the divider has a top portion with a weir at the top portion to permit water to flow from the first chamber, over the weir, and into the second chamber.

6. The apparatus according to claim 5 wherein the apparatus further comprises a filter system downstream of the vessel, the filter system comprising at least one bed of particulate material.

7. The apparatus according to claim 6 wherein the weir is positioned at a level above the top of the bed.

8. An apparatus for treating water which contains contaminants, the apparatus comprising:

a gas contactor vessel that defines an inlet for water to be treated, an outlet for treated water, a first chamber arranged so that water entering through the inlet is permitted to flow upwardly through the first chamber, a second chamber that is downstream of the first chamber and in communication therewith such that water from the first chamber is permitted to flow to the outlet via the second chamber, and a gas collection chamber to contain a volume of gas above water inside the vessel;

an ozone generator system comprising plural ozone generation elements, at least some of the elements being disposed in the second chamber so that water in the vessel cools the elements, and an ozone inlet positioned to inject ozone made by the ozone generation elements into water to be treated in the vessel; and a gas collector operable to maintain the volume of gas contained in the gas collection chamber at a subatmospheric pressure to separate ozone from the water before the water flows from the vessel through the outlet.

9. An apparatus for treating water which contains contaminants, the apparatus comprising:

an upright first chamber having a process flow inlet and a weir at a location above the inlet, the inlet and the weir being positioned to permit an upward flow of water through the chamber;

an upright second chamber downstream of and joined to the first chamber in such a manner that water enters the second chamber by flowing over the weir and falling downwardly for a distance to the surface of a column of water in the second chamber, the second chamber having an outlet positioned below the weir to permit a downward flow of water through the second chamber;

a gas collection chamber above the weir;

a gas diffuser positioned to inject ozone into water such that ozone is contained in water that is inside the first chamber;

an ozone generator system adapted to supply ozone to the diffuser; and a gas collector operable to remove gas from the gas collection chamber.

10. An apparatus for treating water which contains contaminants, the apparatus comprising:

an ozone generator system comprising plural ozone generation elements and an ozone inlet positioned to inject ozone made by the ozone generation elements into water to be treated;

a gas contactor vessel that defines an inlet for water to be treated, an outlet for treated water, a first chamber arranged so that water entering through the inlet is permitted to flow upwardly through the first chamber, a second chamber that is downstream of the first chamber and in communication therewith such that water from the first chamber is permitted to flow through the second chamber;

a mixing vessel having a mixing vessel inlet for receiving water from the second chamber and a mixing vessel outlet, at least some of the elements being disposed in an array inside the mixing vessel so that water in the mixing vessel cools the elements;

a coagulant injection system for injecting coagulant chemicals into the water upstream of the array of elements so that mixing of the chemicals with the water is enhanced by agitation that results as the water passes through the array of elements; and a solids separation system operatively connected to the mixing vessel outlet to receive coagulant-containing water from the vessel.

11. An apparatus for treating water which contains contaminants, the apparatus comprising:

an upright first chamber having a process flow inlet and a weir at a location above the inlet, the inlet and the weir being positioned to permit an upward flow of water through the chamber;

a gas diffuser positioned to inject ozone into water inside the first chamber;

an ozone generator system adapted to supply ozone to the diffuser, the system comprising plural ozone generation tubes;

an upright second chamber downstream of and joined to the first chamber in such a manner that water enters the second chamber by flowing over the weir, the second chamber having an outlet positioned below the weir to permit a downward flow of water through the second chamber;

a gas collection chamber above the weir;

a gas collector operable to remove gas from the gas collection chamber;

an ozone detector which signals when the ozone content of the water exceeds a predetermined limit;

a gas supply controller which responds to a signal from the ozone detector to reduce the rate of ozone injection through the diffuser when the ozone content exceeds the predetermined limit;

a level sensor adapted to signal when the level of the water in the second chamber exceeds a predetermined height limit;

a cooling vessel having (a) a cooling vessel inlet that communicates with the outlet of the second chamber so that water being treated flows from the second chamber and into the cooling vessel, and (b) a cooling vessel outlet, at least some of the ozone generation tubes being disposed in the cooling vessel where the tubes are cooled by water passing through the vessel, the ozone generation tubes inside the vessel being positioned in an array such that water is agitated as it passes through the array;

a coagulant injection system for injecting coagulant chemicals into the water upstream of the ozone generation tubes so that mixing of the chemicals with the water is enhanced by agitation that results as the water passes through the array of tubes;

an upflow clarifier device operatively connected to the cooling vessel outlet to receive water from the cooling vessel, the clarifier device having an outlet that is located below the level of the weir;

a downflow filter positioned downstream of the upflow clarifier device and operatively connected to the outlet of the upflow clarifier device to receive clarified water from the device; and a cleaning mechanism that responds to a signal from the level sensor to initiate cleaning of at least one of the clarifier device and the filter when the predetermined height is exceeded.

12. A method of treating a continuous flow of water which contains contaminants, the method comprising:

directing the flow of water to pass upwardly through a first chamber having a process flow inlet and an outlet comprising a weir located above the inlet;

operating an ozone generator, which comprises plural ozone generation elements, to produce a continuous supply of ozone;

injecting the ozone into the upwardly passing flow of water in such a manner that the ozone mixes with the water;

passing the resulting mixture of water and ozone into contact with a volume of gas maintained at a subatmospheric pressure above the water so that ozone is removed from the water;

directing the ozone-depleted water to pass downwardly by gravity through a second chamber having an outlet located below the weir;

measuring to determine whether the amount of ozone remaining in water downstream of the first chamber exceeds a predetermined amount;

reducing the amount of ozone being generated if the amount of ozone remaining exceeds the predetermined amount;

cooling the ozone generator by contacting an array of the ozone generation elements with the water being treated;

adding coagulant chemicals to the water upstream of the array of ozone generation elements so that the mixture of water and coagulant chemicals is agitated as it passes through the array of elements;

passing the agitated mixture of ozone-depleted water and coagulant chemicals through a bed of particulate material to separate solids from the water;

sensing a condition of water in the second chamber to determine when the level of the water in the second chamber exceeds a predetermined height; and cleaning the bed when it is sensed that the level of the water exceeds the predetermined height.

13. An apparatus for treating water which contains contaminants, the apparatus comprising:

an upright first chamber having (a) a process flow inlet and (b) an outlet at a location above the inlet, the inlet and the outlet being positioned to permit an upward flow of water in a column through the chamber;

an upright second chamber downstream of and joined to the first chamber in such a manner that water flows by gravity from the first chamber into the second chamber via the first chamber outlet, the second chamber having an outlet positioned below the first chamber outlet to permit a downward flow of water in a column through the second chamber;

an ozone inlet to inject ozone into water such that ozone is contained in water that is inside the first chamber;

an ozone generator system adapted to supply ozone to the ozone inlet; and a filter that (a) comprises vessel containing a bed of particulate material and a body of water having an upper surface, (b) is connected to the outlet of the second chamber to receive water from the second chamber, and (c) is positioned so that the first chamber outlet is at an elevation that is above the elevation of the upper surface of the water in the vessel.

\* \* \* \* \*